J. W. COURSEY.
HORSE DETACHER.
APPLICATION FILED MAY 28, 1910.
971,974.
Patented Oct. 4, 1910.
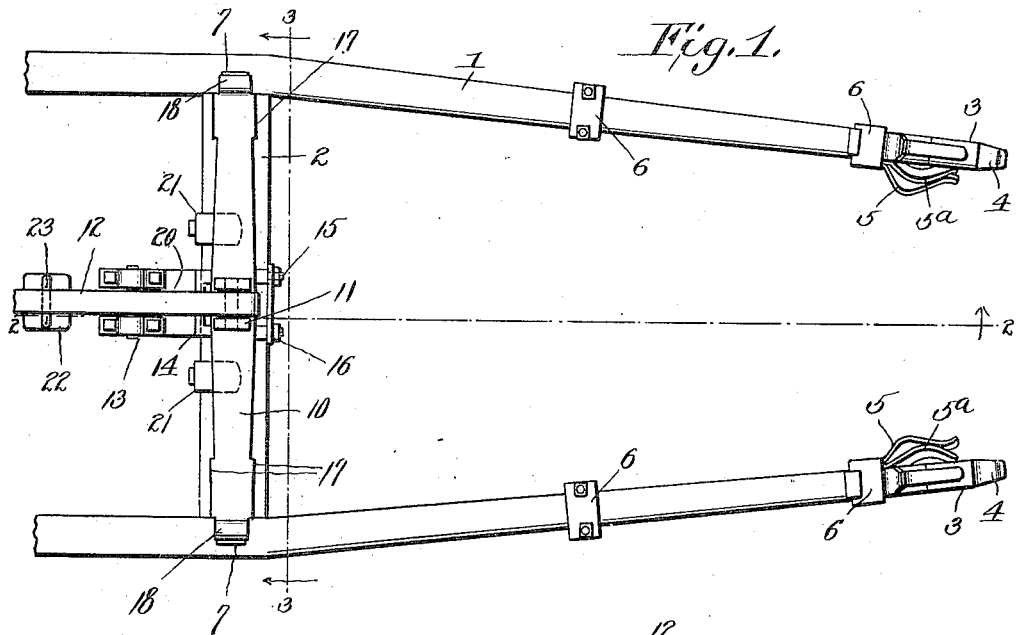
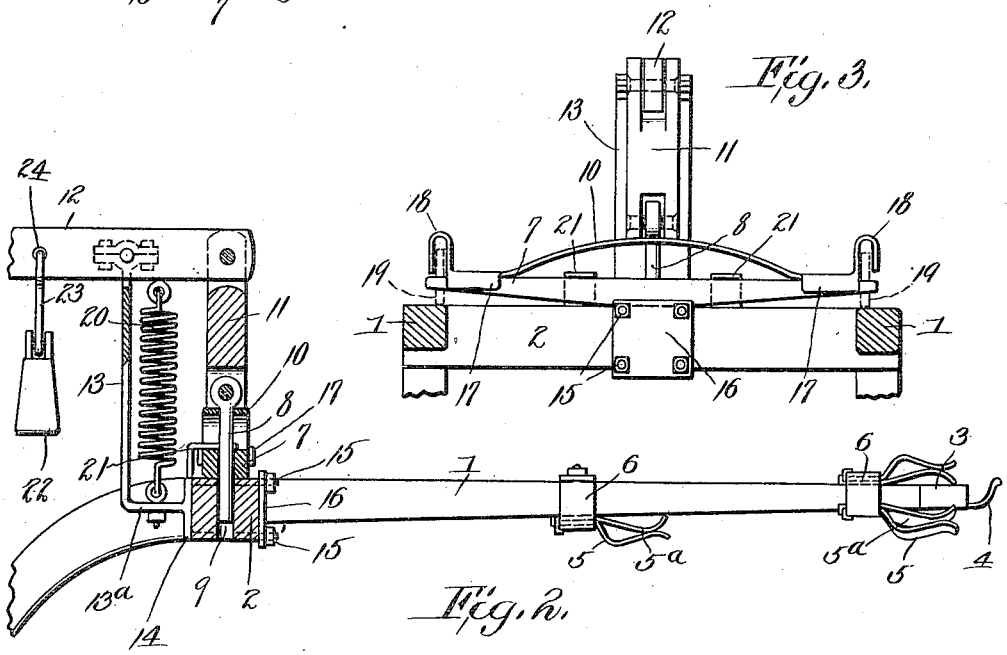
Witnesses
Olive W. Holmes
Harriet B. Cornwall
Inventor
J. W. Coursey,
By J. H. Hill
Attorney

UNITED STATES PATENT OFFICE.

JOHN W. COURSEY, OF AGUDO, TERRITORY OF NEW MEXICO.

HORSE-DETACHER.

971,974. Specification of Letters Patent. Patented Oct. 4, 1910.

Application filed May 28, 1910. Serial No. 563,884.

*To all whom it may concern:*

Be it known that I, JOHN W. COURSEY, citizen of the United States, residing at Agudo, in the county of Guadalupe and Territory of New Mexico, have invented certain new and useful Improvements in Horse-Detachers, of which the following is a specification.

The present invention relates in general to vehicles, and more particularly to a novel means for releasing a horse or other draft animal should the animal get beyond the control of the driver and attempt to run away.

One of the objects of the invention is the provision of a horse detacher which is simple and inexpensive in its construction, which can be readily applied to a vehicle, and which will operate in a positive and reliable manner to accomplish the desired result.

The invention further contemplates a device of this character embodying novel features of construction whereby a horse will be automatically released from an empty vehicle should the animal be left standing and attempt to run away without any one in the vehicle.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a pair of shafts having the improved horse detacher applied thereto. Fig. 2 is a longitudinal sectional view taken on the line 2—2 of Fig. 1, and Fig. 3 is a transverse sectional view taken on the line 3—3 of Fig. 1.

Corresponding and like parts are referred to in the following description and indicated in all the views of the drawing by the same reference characters.

Referring to the drawing, the numerals 1 designate a pair of shafts which are connected in the usual manner at the rear ends thereof by means of a cross bar 2, the forward extremity of each of the shafts being provided with a shoe 3 which is formed with an upwardly curved extension 4. These extensions 4 will operate as runners and prevent the shafts from digging into the ground should they be dropped while the vehicle is in motion. A series of forwardly facing snap hooks 5 is applied to each of the shafts 1, the said snap hooks engaging rings or similar members upon the harness which will pull through the hooks when the horse is released. A spring keeper $5^a$ is provided for each of the snap hooks 5, and both the hook proper and the spring keeper are secured to the shaft in some suitable manner as by means of the clamping bands 6.

A swingletree 7 is pivotally mounted between its ends upon a pin 8, the lower end of the pin being received loosely within an opening 9 in the cross bar 2, while the upper end of the pin passes through a bow shaped spring 10 and is pivotally connected to the lower end of a link member 11. The upper extremity of the link member 11 is in turn pivotally connected to the forward end of a lever 12 which extends rearwardly so as to be readily grasped by an occupant of the vehicle. This lever 12 is pivotally mounted at a point between its ends upon the upper end of a bracket 13, the lower end of the bracket being extended forwardly at $13^a$ and provided with a clip 14 which detachably engages the cross bar 2, the arms of the clip being shown as bifurcated so as to pass upon opposite sides of the opening 9, and being provided with the nuts 15 by means of which they are securely connected to a clamping plate 16.

The central portion of the bow shaped spring 10 is spaced from the swingletree 7 and is preferably thicker and wider than the end portions thereof which bear against the swingletree and have a sliding engagement therewith, the said end portions of the spring being formed with the downwardly extending side flanges 17 which hold the spring against lateral displacement. The extremities of the bow shaped spring 10 are extended upwardly and then downwardly to form the crimped members 18 which engage the traces 19 and normally hold the same in engagement with the swingletree. A coil spring 20 has the upper end thereof secured to the lever 12 while the lower end thereof is secured to the forwardly extended portion $13^a$ of the bracket 13, the said spring normally tending to pull the forward end of the lever 12 downward so as to prevent accidental withdrawal of the pivot pin 8 upon which the swingletree is mounted. For the purpose of preventing the swingletree from working up on the pin 8, retaining fingers 21 are provided, the said fingers being secured to the rear edge of the cross bar 2 and extending loosely over the top of the swingletree so as to hold the swingletree against the cross bar without interfering with the usual swinging movements thereof.

Should the horse become unmanageable so that it would be desired to release him from the vehicle, the driver could grasp the rear end of the lever 12 and push downwardly thereon. This would result in an upward movement of the forward end of the lever and a withdrawal of the pivot pin 8 from the opening 9. The swingletree would then be completely detached from the vehicle and the rings upon the harness would pull through the snap hooks 5. The shafts 1 would then drop upon the ground, but the shoes 3 and extensions 4 would prevent the same from digging into the ground in such a manner as to injure the vehicle or throw the occupants thereof from their seats.

Instead of pushing downwardly upon the rear end of the lever 12 the operator could pull upwardly thereon and thereby cause the link member 11 to bear downwardly upon the central portion of the bow shaped spring 10 and force the same toward the swingletree. This would tend to straighten out the bow shaped spring and would force the ends thereof outwardly so as to shove the traces 19 over the extremities of the swingletree. The horse would then be released as in the previous instance.

Provision is also made for automatically releasing the horse should the animal attempt to run away with an empty vehicle from a standing position. For this purpose a weight 22 is utilized, the said weight being formed with a hook 23 adapted to detachably engage an opening 24 in the lever 12. This weight is placed in position when the animal is left standing, and the leverage of the weight is not sufficient to operate the lever and withdraw the pin 8 from the opening 9 when the vehicle is standing still. However, should the horse attempt to run away, the jolting of the vehicle would cause the weight 22 to exert a series of jerks upon the lever 12, which jerks would be sufficient to operate the lever and withdraw the pin 8 so as to release the swingletree.

Having thus described the invention, what I claim as new and desire to secure by Letters Patent, is:

1. The combination of a vehicle, a lever mounted upon the vehicle, horse detaching means adapted to be operated by the lever, and a weight applied to the lever, the said weight being insufficient to operate the lever when the vehicle is at a standstill but the jolts of the vehicle when in motion causing the weight to exert a series of jerks upon the lever for operating the same.

2. The combination of a vehicle, a lever carried by the vehicle and pivotally mounted at a point between its ends, horse detaching means having an operative connection with the lever, a spring engaging the lever upon one side of the pivot thereof for holding the lever yieldingly against operation, and a weight applied to the lever upon the opposite side of the pivot, the said weight being insufficient to operate the lever when the vehicle is at a standstill, but the jolts of the vehicle when in motion causing the weight to exert a series of jerks upon the lever for operating the same.

3. In a horse detacher, the combination of a pair of shafts, a cross bar connecting the shafts, a bracket applied to the cross bar, a lever pivotally mounted upon the bracket, a swingletree, a pivot pin upon which the swingletree is mounted, the said pivot pin having an operative connection with the lever so as to be withdrawn through the medium thereof, means for normally holding the lever yieldingly against operation, and means operated by the jolts of the vehicle when in motion for operating the lever to withdraw the pivot pin and release the swingletree.

4. In a horse detacher, the combination of a vehicle, a swingletree, a pivot pin upon which the swingletree is mounted, a lever having an operative connection with the pivot pin, a weight detachably applied to the lever, the said weight being insufficient to operate the lever when the vehicle is at a standstill, but the jolts of the vehicle when in motion causing the weight to exert a series of jerks upon the lever for operating the same.

In testimony whereof I affix my signature in presence of two witnesses.

JOHN W. COURSEY.

Witnesses:
C. W. FOOR,
D. J. McCANNE.